(12) United States Patent
Yoshino et al.

(10) Patent No.: US 6,204,957 B1
(45) Date of Patent: Mar. 20, 2001

(54) SECOND HARMONIC WAVE-GENERATING ELEMENT

(75) Inventors: Takashi Yoshino, Aichi Pref.; Katsuhiro Imai; Minoru Imaeda, both of Nagoya; Kiyofumi Chikuma, Tsurugashima; Atsushi Onoe, Tsurugashima; Ayako Yoshida, Tsurugashima, all of (JP)

(73) Assignees: NGK Insulators, Ltd., Nagoya (JP); Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/307,525

(22) Filed: May 7, 1999

(30) Foreign Application Priority Data

May 12, 1998 (JP) .................................. 10-128759

(51) Int. Cl.[7] ........................................ G02F 1/37
(52) U.S. Cl. .......................... 359/328; 359/332; 252/584
(58) Field of Search ................... 359/328, 326, 359/327, 329, 330, 331, 332; 385/129–132, 141–145, 147; 252/582, 584

(56) References Cited

U.S. PATENT DOCUMENTS

| 4,740,265 | 4/1988 | Bierlein et al. . | |
| 5,737,117 | * 4/1998 | Imaeda et al. ................... | 359/332 |

* cited by examiner

Primary Examiner—James Phan
(74) Attorney, Agent, or Firm—Burr & Brown (57) ABSTRACT

A second harmonic wave-generating element for generating a second harmonic wave from a fundamental wave, having an optical waveguide layer made of first epitaxial material having a fundamental composition of $K_3Li_{2-X}(Nb_{1-Y}Ta_Y)_{5+X}O_{15+Z}$, an underclad part made of second epitaxial material having a fundamental composition of $K_3Li_{2-X+A}(Nb_{1-Y-B}Ta_{Y+B})_{5+X-A}O_{15+Z}$, an overclad part made of third epitaxial material having a fundamental composition of $K_3Li_{2-X+C}(Nb_{1-Y-D}Ta_{Y+D})_{5+X-C}O_{15+Z}$ and formed on and contacting the optical waveguide layer, wherein X=0.006 to 0.5, Y=0.00 to 0.05, A=0.006 to 0.12, B=0.005 to 0.5, C=0.006 to 0.12, D=0.005 to 0.5, X−A≦0, X−C≧0, |A−C|≦0.006, and |B−D|≦0.005).

6 Claims, 6 Drawing Sheets

FIG_5a

FIG_5b

FIG_6

SECOND HARMONIC WAVE-GENERATING ELEMENT

BACKGROUND OF THE INVENTION

1. Field of the Invention

This invention relates to a second harmonic wave-generating (SHG) element preferably usable for a device such as a blue laser source.

2. Related Art Statement

An element to generate a blue laser is suggested which is made by forming an optical waveguide having periodically polarization-inversed structure and in which an infrared semiconductor laser is introduced into the optical waveguide (U.S. Pat. No. 4,740,265, JP-A-5-289131, and JP-A-5-173213). For example, JP-A-6-51359 discloses a SHG element in which a polarization-inversed layer, an optical waveguide, a dielectric film, and a reflective grating layer are formed and a thickness of the dielectric film is defined into a given value.

Although these techniques require high-precisely controlling of domains, it is very hard to do so. An allowable temperature for the phase-matching must be controlled within a precision range of ±0.5° C. Moreover light damage of the optical waveguide may be recognized at 3 mw and over of a light energy. Considering these phenomena, it is pointed out that these techniques have a problem as a practical device.

On the other hand, NGK Insulators, Ltd. suggested in JP-A-8-339002 a SHG element having little light damage without a quasi-phase-matching or controlling domains at a high-precision. In this literature, a single crystal substrate is made of lithium potassium niobate or Ta-substituted lithium potassium niobate by micro pull-down method, and an optical waveguide made of a material of the same kind as of that of the substrate is formed on the substrate.

The SHG element was an epoch-making element because the element could make light damage remarkably small in the optical waveguide for converting a wavelength, and thereby an outlook for providing an element for a practical use can be obtained. However, for wide use as a blue laser source, it is required that a generation efficiency of a second harmonic wave be further increased.

SUMMARY OF THE INVENTION

It is an object of the present invention to further develop a generation efficiency of a second harmonic wave. It is also an object to make light damage much smaller.

This invention relates to a second harmonic wave-generating element for generating a second harmonic wave from a fundamental wave, comprising an optical waveguide layer made of first epitaxial material having a fundamental composition of $K_3Li_{2-X}(Nb_{1-Y}Ta_Y)_{5+X}O_{15+Z}$, an underclad part made of second epitaxial material having a fundamental composition of $K_3Li_{2-X+A}(Nb_{1-Y-B}Ta_{Y+B})_{5+X-A}O_{15+Z}$, an overclad part made of third epitaxial material having a fundamental composition of $K_3Li_{2-X+C}(Nb_{1-Y-D}Ta_{Y+D})_{5+X-C}O_{15+Z}$ and formed on and contacting the optical waveguide layer, wherein X=0.006 to 0.5, Y=0.00 to 0.05, A=0.006 to 0.12, B=0.005 to 0.5, C=0.006 to 0.12, D=0.005 to 0.5, $X-A \geq 0$, $X-C \geq 0$, $|A-C| \leq 0.006$, and $|B-D| \leq 0.005$).

This invention will be still more described with reference to FIG. 1.

According to the investigation of the inventors, in a structure in which a single-layered three-dimensional optical waveguide is formed on a single-crystal substrate, an integrated value of an overlapped portion of a fundamental mode between a fundamental wave and a second harmonic wave, is small, whereby a high converting efficiency can not be obtained. In the case that a film made of another material such as a dielectric material ($SiO_2$, $Ta_2O_5$) is formed on the three-dimensional optical waveguide, the above integrated value of the overlapped portion could little improved, because the refractive index of the dielectric film is quite different from that of the three-dimensional optical waveguide.

Figure 1:
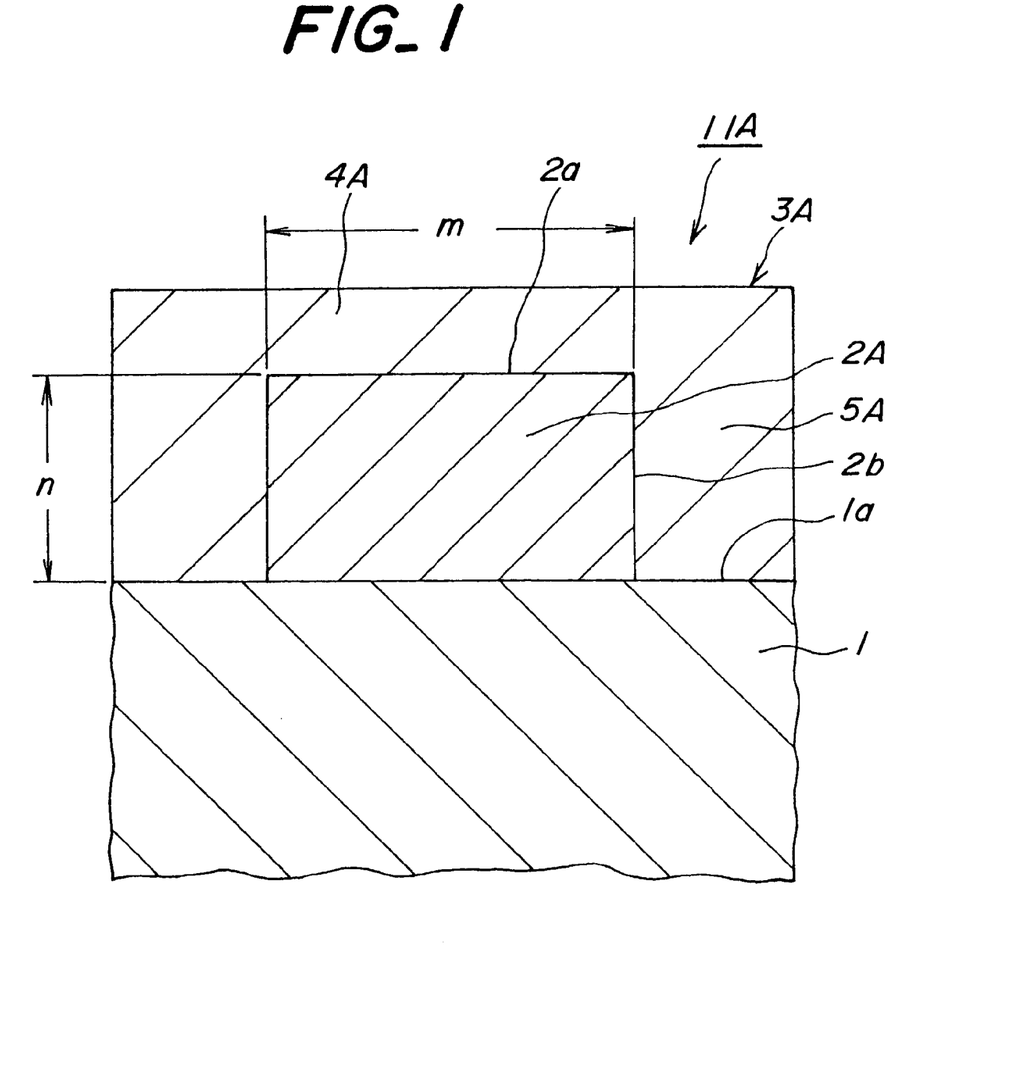
FIG. 1 is a cross sectional view schematically showing a main part of a second harmonic wave-generating device 1 of the present invention.

In this invention, the inventors conceived the structure as schematically shown in FIG. 1 in which an optical waveguide layer 2A is sandwiched between an underclad part 1 and an overclad part 4A and controlling, as above mentioned, each of the fundamental compositions of the optical waveguide layer, the underclad part, and the overclad part. Consequently, they found that in a wavelength range of a light capable of generating a blue laser, particularly preferably a range in which the wavelength of a light to be phase-matched, is 780 nm to 940 nm, the optical waveguide becomes a single mode (fundamental mode)-optical waveguide and the mode-overlapping integration between the fundamental wave and the second harmonic wave become large, whereby the generation efficiency of the second harmonic wave become conspicuously large.

The second harmonic wave-generating element according to the present invention can generate a laser of a range of 390 nm to 470 nm, for example. Thus, it can be widely used as a device for optical disk memory, a medicine uses, an optochemical uses, various optical measurements, etc. by using such a laser having a short wavelength.

BRIEF DESCRIPTION OF THE DRAWINGS

For a better understanding of this invention, reference is made to the attached drawings, wherein.

DETAILED DESCRIPTION OF PREFERRED EMBODIMENTS

In each of the fundamental composition, "X" is 0.006 to 0.5 (particularly preferably 0.006 to 0.02). "Y", a ratio of substituted Ta to Nb, 0.00 to 0.05 (particularly preferably 0.00 to 0.01).

"A" and "C" are each 0.006 to 0.12, particularly preferably 0.006 to 0.02. The ranges of "A" and "C" show that in the fundamental composition of the underclad part and the overclad part, the amount of lithium contained therein is more than that in the optical waveguide and the total amount of niobium and tantalum contained therein is less than that in the optical waveguide, respectively. The range of "B" and "D", which show that in the fundamental compositions of the underclad part and the overclad part, the amount of tantalum contained therein is more than that in the optical waveguide, respectively, is 0.005 to 0.5, particularly preferably 0.03 to 0.1. By controlling "A", "B", "C", and "D", a respective refractive index of each of the optical waveguide, the underclad part, and the overclad part can appropriately controlled.

"X–A" and "X–C" are not less than 0, particularly preferably not less than 0.01.

Moreover, for minimizing the integrated value of the overlapped portion, it is important to control the deviation between "A" and "C" and that between "B" and "D" with respect to the fundamental composition of the overclad part and the underclad part to not more than a given part value. Concretely, the difference between "A" and "C" has to be not more than 0.006, particularly preferably not more than 0.003, and the difference between "B" and "D" has to be not more than 0.005, particular preferably not more than 0.002.

The underclad part may be composed of a single crystal substrate or an epitaxial film formed on such a single crystal substrate.

The epitaxial material of each of the fundamental compositions is a single crystal or an orientated film.

As the fundamental materials of the optical waveguide layer, the underclad part, and the overclad part, a material having a tungsten bronze structure, made of K, Li, Nb, Ta, O can be employed (called as a "KLNT material", hereinafter). However, within the composition range enabling the structure to be maintained, each element may be partially substituted. For example, K or Li may be partially substituted for Na, Rb, etc.

In a preferred embodiment, as schematically shown in the sectional view in FIG. 1, the optical waveguide layer is a three-dimensional optical waveguide 2A, which is formed on a surface 1a of an underclad part 1. An upper surface 2a of the three-dimensional optical waveguide 2A is covered with an overclad layer 4A.

Furthermore, in this embodiment, a width "m" and a height "n" of the three-dimensional optical waveguide 2A may be 3.0 $\mu$m to 10.0 $\mu$m and 0.5 $\mu$m to 5.0 $\mu$m, respectively. Thereby, a single mode travelling can be realized and a propagation loss can be reduced.

Moreover, side faces 2b of the three-dimensional optical waveguide 2A as viewed in a transverse section may be covered with a sideclad part 5A, which may be composed of an epitaxial material having the same composition as that of the overclad part 4A. Accordingly, in FIG. 1, an integral clad part 3A is composed of the overclad part 4A and the sideclad part 5A.

Thereby, a propagation loss of a light travelling the three-dimensional optical waveguide can be further reduced to still more develop the output of a second harmonic wave.

Figure 2:
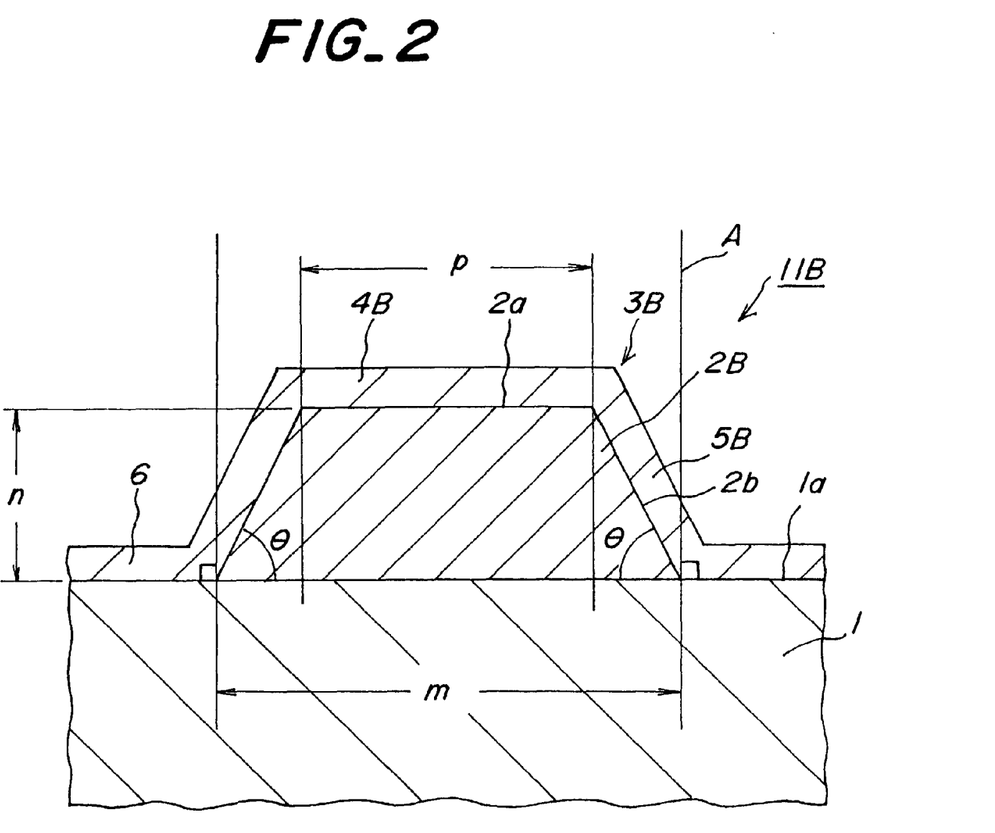
FIG. 2 is a cross sectional view schematically showing a preferred embodiment of a structure of an optical waveguide, an underclad part, and an overclad part.

Furthermore, as an element 11B schematically shown in FIG. 2, a tilted angle θ of a side face 2b of a three-dimensional optical waveguide 2B to the surface 1a of the underclad part 1 to may be smaller than 90 degree, concretely, 60 degree to 120 degree. This tilted angle influences the propagation loss.

Hereupon, in FIG. 2, an upper surface 2a of the three-dimensional optical waveguide 2B is covered with an overclad part 4B and the side faces 2b of the optical waveguide 2B are covered with sideclad parts 5B. An integral clad part 3B is composed of the overclad part and the sideclad part.

Such parts of the surface 1a of the single crystal substrate 1 as not covered with the optical waveguide 2B are covered with a film 6 made of the same KLNT material as that of the overclad part and the sideclad part.

The single crystal substrate may be preferably made by a micro pull-down method, which is suggested by the inventors in the JP-A-8-259375 and the JP-A-8-319191.

The optical waveguide layer, the overclad part, the underclad part and the sideclad part may be formed by a metalorganic vapor phase epitaxial method or a liquid phase epitaxial method.

The second harmonic wave-generating element may further comprise a reflective grating part for fixing the wavelength of a fundamental wave entering the optical waveguide and a temperature controlling means for controlling a temperature of at least the optical waveguide.

Figure 3:
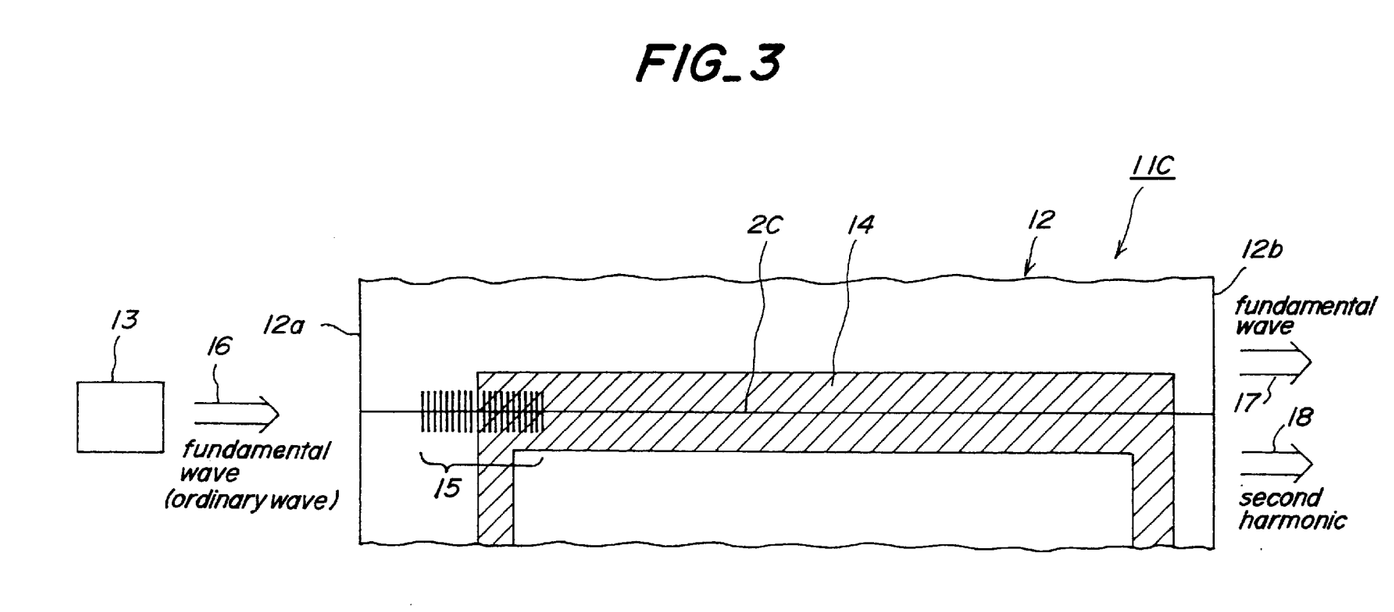
FIG. 3 is a plan view schematically showing an element 11C in a preferred embodiment of the present invention.

FIG. 3 to FIG. 6 show an embodiment in which the reflective grating part and the optical waveguide are formed on an integral substrate. FIG. 3 is a plan view schematically showing a part of a second harmonic wave-generating element 11C in this embodiment.

The second harmonic wave-generating element 11C has a single crystal substrate 12 having, for example, a rectangular parallelepiped shape. Formed on a surface of the substrate 12 are a three-dimensional optical waveguide 2C and a reflective grating part 15, on which a film heater 14 is formed. Hereupon, FIG. 3 shows positions of 2C, 14, and 15 in plane. A reference numeral 13 denotes a laser source.

A fundamental wave (an ordinary ray) 16 is led into the second harmonic wave-generating device 11C from an incident end 12a of the substrate 12. Thereafter, the fundamental wave 16 is led into the optical waveguide 2C and passes the reflective grating part 15. During the fundamental wave passing the part 15, the wavelength of the fundamental wave is fixed with returning its light wave from the part 15. Since the refractive index of an ordinary ray in the optical waveguide 2C under the reflective grating part 15 does not almost change when the heater 14 generates a heat, the fixed wavelength not much influence the optical power. Moreover, the refractive index of an extraordinary ray in the optical waveguide 2C can be increased by working the film heater 14. Thereby, a wavelength of a second harmonic wave 17 can be controlled dynamically, and an output of the second harmonic wave 17 can be increased and optimized. A reference numeral 18 denotes an ordinary ray leaving from an end 12b of the substrate.

For example, if the environmental temperature decreases, the entire temperature in the optical waveguide 2C decreases and the refractive index of an extraordinary ray decreases, even though the heating value of the film heater 14 is constant. If the decrease of the output of the second harmonic wave is detected, by rising the voltage in the film heater 14, the entire temperature in the optical waveguide 2C can be increased and thereby the refractive index of an extraordinary ray can be increased.

However, if a temperature in the optical waveguide at which a wavelength of the fundamental wave matches that of a second harmonic wave, is lower than an environmental temperature, it is likely to be difficult to carry out the above controlling method. Thus, the temperature in the optical waveguide 2C at which a wavelength of the fundamental wave matches that of a second harmonic wave, is preferably higher than a maximum temperature of an environmental temperature by 10° C. and over.

On the other hand, a film-like heat-absorbing member such as a Peltier element instead of the film heater may be used. If the temperature in the wavelength-converting optical waveguide deviates the temperature in which the fundamental wave phase-matches the second harmonic wave, the Peltier element is operated so that the optical waveguide's temperature may return to the phase-matching temperature.

Figure 4:
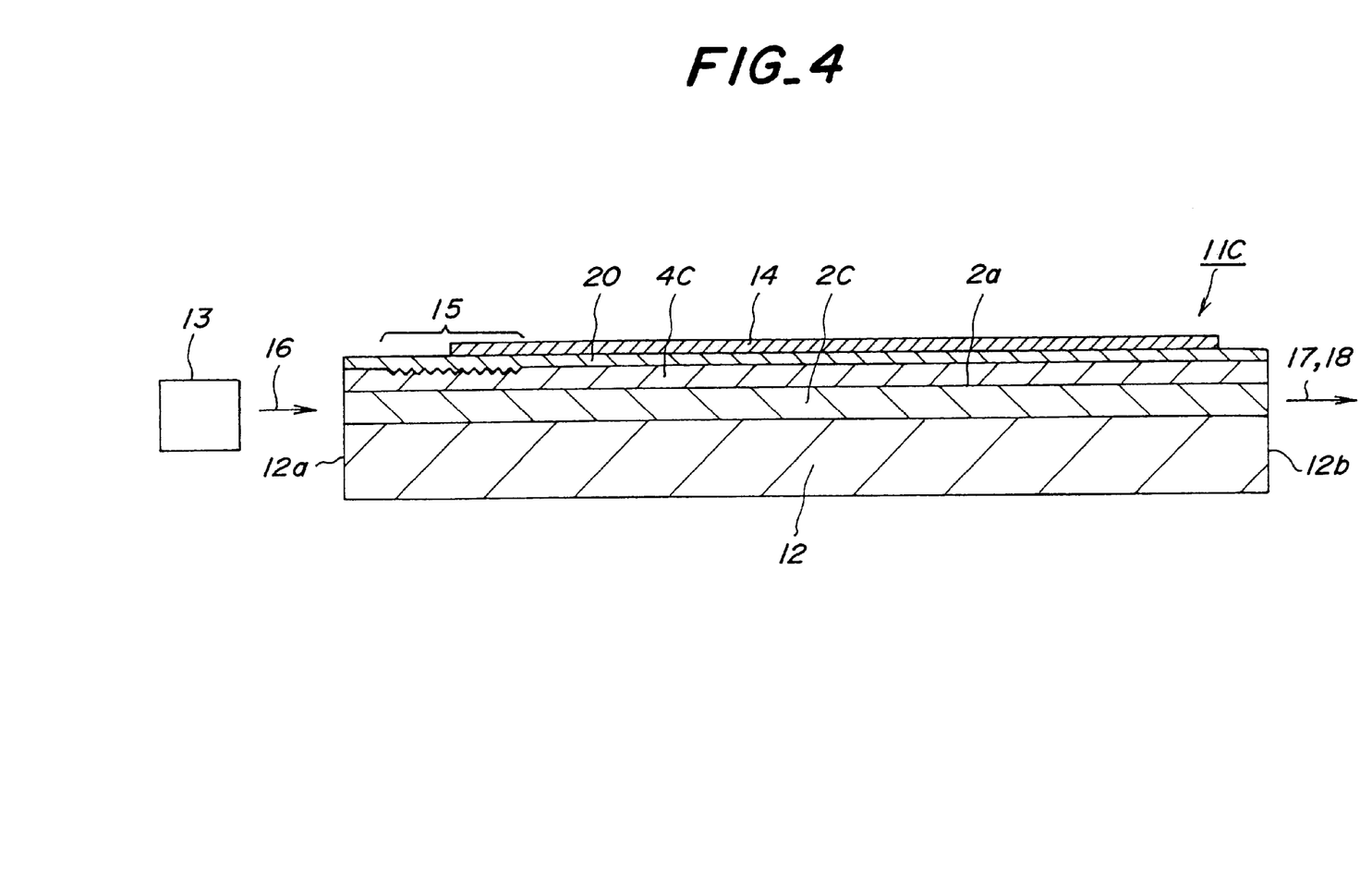
FIG. 4 is a side view schematically showing a preferred embodiment in the element 11C of FIG. 3.
Figure 5A:
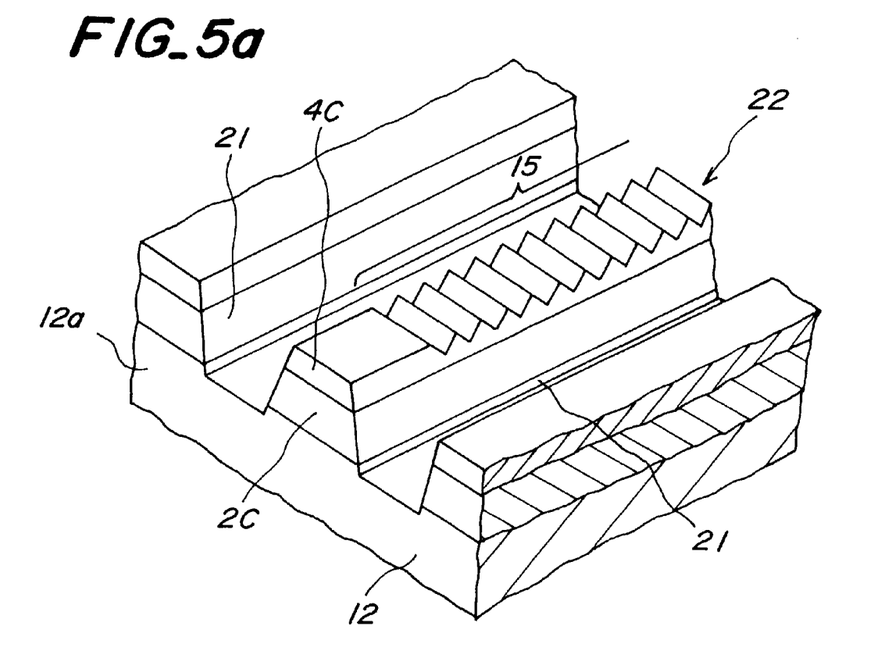
FIG. 5(a) is a perspective view showing a part of an assembly before a thin film-heater and a dielectric layer are formed in the element 11C of FIG. 4.
Figure 5B:
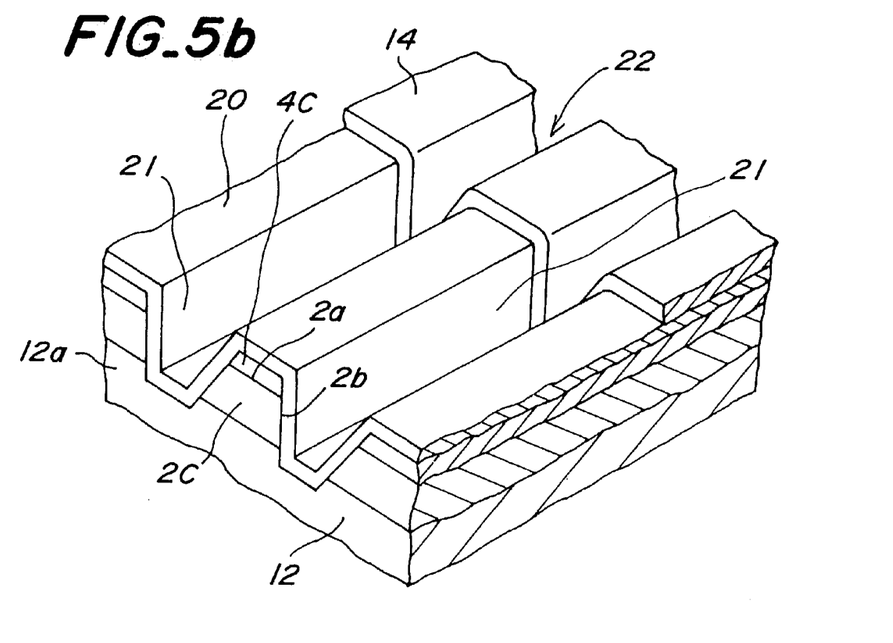
FIG. 5(b) is a perspective view showing a part of an assembly after the dielectric layer and the thin film-heater are formed on the assembly of FIG. 5(a)
Figure 6:
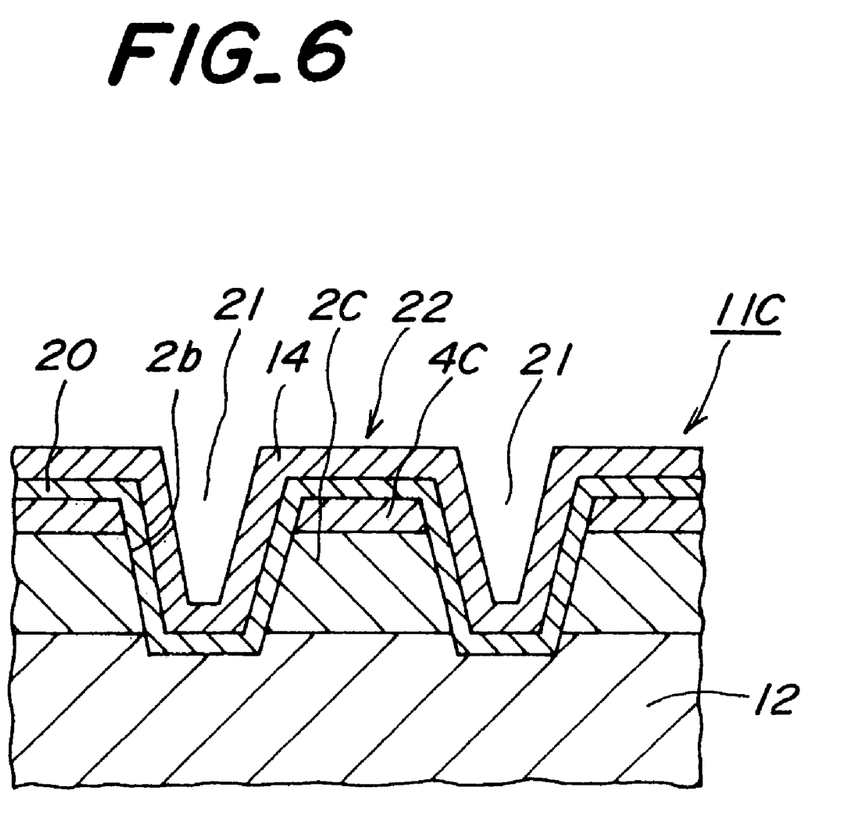
FIG. 6 is a transverse sectional view of a part of the element 11C of FIG. 5(b).

Next, a preferred embodiment of an element in FIG. 3 will be described with reference to FIG. 4 to FIG. 6. FIG. 4 is a side view schematically showing the preferred embodiment of the second harmonic wave-generating element 11C, FIG. 5(a) is a perspective view showing a part of an optical waveguide in an enlarged scale, FIG. 5(b) is a perspective view showing the same part as that of FIG. 5(a) in a state after forming a dielectric layer and a film heater, and FIG. 6 is a transverse sectional view of the element of FIG. 5(b).

A ridge-type optical waveguide 2C is formed on a surface of a single crystal substrate 12 and a overclad layer 4C is formed on the upper surface 2a of the optical waveguide. Ditches forming a diffraction grating at uniform period are formed on the upper surface portion of the overclad layer 4C by reactive ion etching, for example, to compose a reflective grating part 15.

A dielectric layer 20 is formed to cover the ridge-type optical waveguide 2C and the overclad layer 4C. The film heater 14 is formed in a given area on the dielectric layer 20. A ridge structure 22 is composed of the optical waveguide 2C, the overclad layer 4C, and the dielectric layer 20, and slender ditches 21 are formed in both the sides of the ridge structure 22.

Although a material composing the dielectric layer is not limited, $Ta_2O_5$, $SiO_2$, $TiO_2$, $HfO_2$, or $Nb_2O_5$ is preferably employed. As a material composing the film heater, Ni, Ti, Ta, Pt, or Cr is preferably employed. Instead of the film heater, a Peltier element may be used.

EXAMPLE

The invention will be explained in more detail with reference to the following example.

In this example, an element as shown in FIG. 2 was produced.

A plate of a KLNT single crystal was formed by the micro pull-down method. Concretely, powdery potassium carbonate, lithium carbonate, niobium chloride, and tantalum oxide were mixed in a composition ratio of 30.0:24.0:45.0:0.92 to obtain a powdery raw material. About 50 g of the powdery raw material was put into a crucible made of platinum, and it was heated up to the temperature of 1150° C. to be melted. More concretely, the powdery raw material in the crucible was melted while a space in an upper side of a furnace was controlled to a temperature range of 1100° C. to 1200° C. A plate having a "C" crystal face was pulled down in a direction of an "a" crystal axis through a nozzle formed in a bottom face of the crucible at a speed of 10 mm/hour while a single crystal-growing part was set at a temperature range of 1050° C. to 1150° C. Consequently, a single crystal substrate could be grown in a thickness of 1 mm, a width of 30 mm, and a length of 30 mm. The substrate was used as an underclad part. The composition of the substrate was $K_3Li_2(Nb_{0.98}Ta_{0.02})_5O_{15}$. (0039)

Then, an epitaxial film was formed by the metalorganic vapor phase epitaxial method. Concretely, as starting materials, di-pivaloyl-methanato potassium [$K(C_{11}H_{19}O_2)$ (called as "K(DPM)", hereinafter)], di-pivaloyl methanato-lithium [$Li(C_{11}H_{19}O_2)$ (called as "Li(DPM)", hereinafter)], and penta-ethoxy niobium [$Nb(OC_2H_5)_5$ (called as "Nb(PE)", hereinafter)] were employed. They were charged into respective source containers, thereafter heated up to respective gasfication temperature to gasfy them. Each gas was introduced into a reactor chamber with use of a Ar carrier gas controlled at its flow rate. The flow rates of the gases were 250 ml/min for K(DPM), 500 ml/min for Li(DPM), 150 ml/min for Nb(PE), respectively.

In the conditions of the pressure in the reactor chamber being 20 torr and the temperature of the substrate being 650° C., a single crystal film having the thickness of 3.2 μm, made of a KLN material, was obtained by film-forming for 3 hours. The composition of the thus obtained film was $K_3Li_{1.95}Nb_{5.0.5}O_{15}$.

A strip-like film pattern of Ti was formed in a thickness of 1 μm, a width of 5 μm, a length of 25 mm, and a pitch of 2 mm by a normal photolithography. The thus obtained sample was processed by a reactive ion etching method. In this case, the sample was processed at a RF electric power of 250 W for 100 minutes with $C_2$, $F_6$, and $O_2$ gases under the pressure of 0.02 torr to form a ridge-type optical waveguide 2B as shown in FIG. 2. The width "p" of an upper surface 2a, the width "m" of the lower surface, and the height "n" of the optical waveguide 2B were 4 μm, 6 μm, and 2.5 μm, respectively. The tilted angle θ was 63 degree.

A clad part 3B and a film 6 were formed on the sample by the metalorganic vapor phase epitaxial method as in the case of the optical waveguide 2B. The flow rates of gasses were 200 ml/min for K(DPM), 600 ml/min for Li(DPM), 150 ml/min for Nb(PE), and 20 ml/min for penta-ethoxy tantalum [$Ta(OC_2H_5)_5$]. In the conditions of the pressure in a reactor chamber being 20 Torr and the temperature of the substrate being 650° C., single crystal films 3B and 6 having the thickness of 2.2 μm, made of a KLNT material, were obtained by film-forming for 2 hours. The composition of the thus obtained film was $K_3Li_{1.99}(Nb_{0.98}Ta_{0.02})_{5.01}O_{15}$.

The thus obtained sample was cut out to form chips in a length of 10 mm and a width of 2 mm as viewed in a direction of the optical waveguide. An input end and an output end of the element were optically polished, and coated with an anti-reflective film having a reflective index of 0.5% at a wavelength of 860 nm and an anti-reflective film having a reflective index of 0.5% at a wavelength of 430 nm, respectively. A titanium-sapphire laser was led into the element. Consequently, the laser was phase-matched at a wavelength of 862 nm to obtain a second harmonic wave having an output power of about 4 mW at 431 nm, when the input power from the laser was 100 mW.

As above mentioned, according to the present invention, an element having a high generation efficiency of a second harmonic wave can be obtained.

What is claimed is:

1. A second harmonic wave-generating element for generating a second harmonic wave from a fundamental wave, comprising an optical waveguide layer made of first epitaxial material having a fundamental composition of $K_3Li_{2-X}(Nb_{1-Y}Ta_Y)_{5+X}O_{15+Z}$, an underclad part made of second epitaxial material having a fundamental composition of $K_3Li_{2-X+A}(Nb_{1-Y-B}Ta_{Y+B})_{5+X-A}O_{15+Z}$, an overclad part made of third epitaxial material having a fundamental composition of $K_3Li_{2-X+C}(Nb_{1-Y-D}Ta_{Y+D})_{5+X-C}O_{15+Z}$ and formed on and contacting the optical waveguide layer, wherein X=0.006 to 0.5, Y=0.00 to 0.05, A=0.006 to 0.12, B=0.005 to 0.5, C=0.006 to 0.12, D=0.005 to 0.5, X−A≧0, X−C≧0, |A−C|≦0.006, and |B−D|≦0.005).

2. A second harmonic wave-generating element claimed in claim 1, wherein the fundamental wave is an ordinary ray and the second harmonic wave is an extraordinary ray.

3. A second harmonic wave-generating element claimed in claim 1, wherein the optical waveguide is a three-dimensional optical waveguide and an upper surface of the three-dimensional optical waveguide is covered with the overclad part.

4. A second harmonic wave-generating element claimed in claim 1, wherein the optical waveguide is a three-dimensional optical waveguide having a width of 3.0 μm to 10.0 μm and a height of 0.5 μm to 5.0 μm, and an upper surface of the three-dimensional optical waveguide is covered with the overclad part.

5. A second harmonic wave-generating element claimed in claim 1, wherein the optical waveguide is a three-dimensional optical waveguide and an upper surface of the three-dimensional optical waveguide is covered with the overclad part, and a side face as viewed in a transverse section of the three-dimensional optical waveguide is covered with a sideclad part, which is made of an epitaxial material having the same fundamental composition as that of the third epitaxial material constituting the overclad part.

6. A second harmonic wave-generating element claimed in claim 1, which further comprises a reflective grating part for fixing a wavelength of the fundamental wave entering the optical waveguide and a temperature controlling means for controlling the temperature of at least the optical waveguide, wherein the optical waveguide is a three-dimensional optical waveguide and an upper surface of the three-dimensional optical waveguide is covered with the overclad part.

* * * * *